(12) United States Patent
Livne et al.

(10) Patent No.: US 9,736,189 B2
(45) Date of Patent: Aug. 15, 2017

(54) SYSTEM AND METHOD FOR OPTIMIZING SCIM/SERVICE BROKER AND APPLICATIONS BASED ON IMS INITIALFILTERCRITIERIA (IFC) EXTENSION

(71) Applicant: Oracle International Corporation, Redwood Shores, CA (US)

(72) Inventors: Shlomo Livne, Ra'Anana (IL); Tzach Livyatan, Tel-Aviv (IL)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 407 days.

(21) Appl. No.: 13/974,998

(22) Filed: Aug. 23, 2013

(65) Prior Publication Data
US 2015/0058443 A1  Feb. 26, 2015

(51) Int. Cl.
*G06F 15/16* (2006.01)
*H04L 29/06* (2006.01)

(52) U.S. Cl.
CPC ...... *H04L 65/1006* (2013.01); *H04L 65/1063* (2013.01)

(58) Field of Classification Search
None
See application file for complete search history.

(56) References Cited

U.S. PATENT DOCUMENTS

| | | | |
|---|---|---|---|
| 2003/0224781 A1* | 12/2003 | Milford | H04L 1/16 455/426.1 |
| 2007/0088836 A1* | 4/2007 | Tai | H04M 7/128 709/227 |
| 2009/0122794 A1* | 5/2009 | Wu | H04W 8/20 370/352 |

* cited by examiner

*Primary Examiner* — Umar Cheema
*Assistant Examiner* — Anthony Rotolo
(74) *Attorney, Agent, or Firm* — Tucker Ellis LLP (57) ABSTRACT

A system and method which overcomes the limitations of the present modes of operating a SCIM by improving efficiency of information transfer in application chains while assuring that service logic is not affected. Initial filtering criteria for applications are extended to include criteria which define types of information to be processed by the application. The SCIM then determines whether each received request meet the criteria for each application. The SCIM filters out certain messages from applications to which the messages are irrelevant thereby dynamically varying the applications through which messages are passed in response to message characteristics. The system and method avoid the need to send request and response through applications to which their content is irrelevant.

14 Claims, 8 Drawing Sheets

Figure 1A

PRIOR ART

SYSTEM AND METHOD FOR OPTIMIZING SCIM/SERVICE BROKER AND APPLICATIONS BASED ON IMS INITIALFILTERCRITIERIA (IFC) EXTENSION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to orchestration of applications in telecommunications networks and in particular to a system and method for reducing communications and processing overhead within a chain of applications.

FIELD OF THE INVENTION

A Service Capability Interaction Manager (SCIM) and/or Service Broker provides for orchestrating multiple applications in an application server. A primary function of the SCIM is to allow chaining of applications thereby allowing operators to use multiple applications from different vendors while simplifying applications and maintenance costs. SCIM orchestration is performed in accordance with signaling from the network. Orchestration of multiple applications is performed by creating a chain of applications. Once the chain is formed all information is passed through every application in the chain for processing.

For example, where there are two applications, Application_A, Application_B, in a chain, all messages from the originating party (forward messages) follow the path: originating party to Application_A to Application_B to terminating party. All messages from the terminating party (backward messages) follow the path: terminating party to Application_B to Application_A to originating party. All information is passed through each application even if the information is not utilized by the Application. Where an application is "interested" in only part of the information or specific events that may be passed between the originating party and the terminating party, this behavior is suboptimal. The additional cost of passing all information to each application is an overhead in resources and latency both in the SCIM and the applications that does not provide additional value.

The overhead in resources and latency only increases when operators utilize larger numbers of applications which depend upon longer application chains. The overhead can be reduced by combining applications into larger applications. However, this would reduce operator flexibility to use multiple applications from different vendors, would make applications more complex, and increase maintenance costs.

It would therefore be desirable to provide a system and method which overcomes the limitations of the present modes of operating a SCIM.

It would further be desirable to improve efficiency of information transfer in application chains while assuring that service logic is not adversely affected.

SUMMARY OF THE INVENTION

The present invention provides a system and method which overcomes the limitations of the present modes of operating a SCIM.

The present invention provides a system and method which improves efficiency of information transfer in application chains while assuring that service logic is not adversely affected.

In accordance with an embodiment of the invention initial filtering criteria for applications are extended to include criteria which define types of information to be processed by the application. The SCIM checks every request passed against the criteria. The SCIM then filters out certain requests from certain applications. The system and method avoid the need to send response messages through applications to which their content is irrelevant.

The system and method of the present invention enhances prior functionality of a SCIM/Service Broker. The conventional SCIM/Service Broker that are used to chain applications all deal with the question of how to create the chain and chain the application one after the other, they do not deal with how to optimize information flow after the chain has been created. The system and method of the present invention is unique in that it optimizes the flow of information following the chain creation. Without the system and method of the present invention the ability to selectively pass information through part of the applications was possible only to proprietary solutions that coded such knowledge based on a specific application and specific application chain. In the system and method of the present invention the initial filtering criteria are used by the SCIM to selectively pass information through part of the applications is an expedient manner without proprietary coded solutions.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such FIG. 1*f* the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Figure 1A:
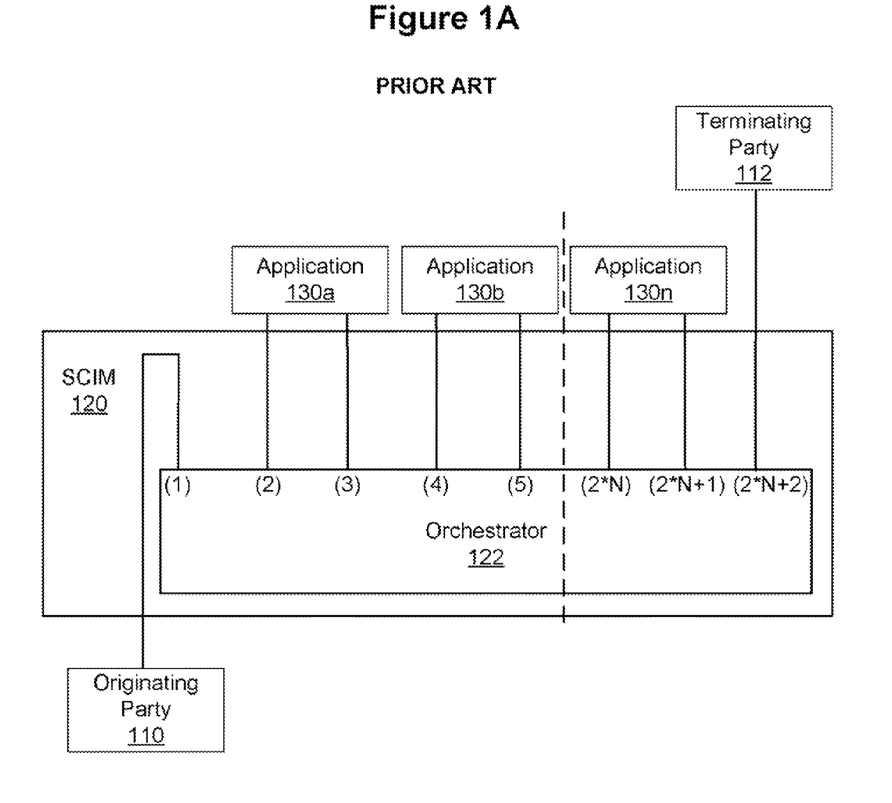
FIG. 1A shows a conventional Service Capability Interaction Manager.

FIG. 1A shows conventional Service Capability Interaction Manager (SCIM) 120 as implemented in the prior art. As shown in FIG. 1A, SCIM 120 includes an orchestrator 122. SCIM 120 provides for orchestrating multiple applications 130*a*, 130*b*, and 130*n* in an application server. A primary function of SCIM 120 is to allow chaining of applications 130*a*, 130*b*, 130*n* thereby allowing operators to use multiple applications from different vendors while simplifying applications and maintenance costs. SCIM orchestration is done according to the signaling from the network. Orchestrator 122 of SCIM 120 orchestrates the applications 130*a*, 130*b*, and 130*n* by creating a chain of applications. The chain comprises a sequence of applications through which all requests and responses for a session must pass.

FIG. 1A shows a chain of N applications 130*a*, 130*b*, and 130*n*. Once the chain is formed, all information is passed through every application 130*a*, 130*b*, and 130*n* in the chain for processing. Thus, all messages from the originating party (forward messages follow the path: originating party to application 130*a*, to application 130*b* to Application 130*n* to terminating party. All messages from the terminating party (backward messages) follow the path: terminating party to application 130*n* to application 130*b* to application 130*a* to originating party.

SCIM 120 and orchestrator 122 generate pairs of back to back (B2B) legs. For each incoming event it creates a leg that handles messages that belongs to that dialog, it then finds the next application it should route the message to and creates a peer B2B leg that should handle events coming and going from the targeted application for that specific dialog. As shown in FIG. 1A, leg mapping for forward messages is: 1→2; 3→4; 5→6; 7→8. The leg mapping for backward messages is: 8→7; 6→5; 4→3; 2→1. The mapping does not vary for different messages.

As shown in FIG. 1A, all information is passed through each application 130*a*, 130*b*, 130*n* even if the information is not utilized by the application. Where an application is "interested" in only part of the information or specific events that may be passed between the originating party and the terminating party, this behavior is suboptimal. The additional cost of passing all information to each application is an overhead in resources and latency both in the SCIM and the applications that does not provide additional value.

Figure 1B:
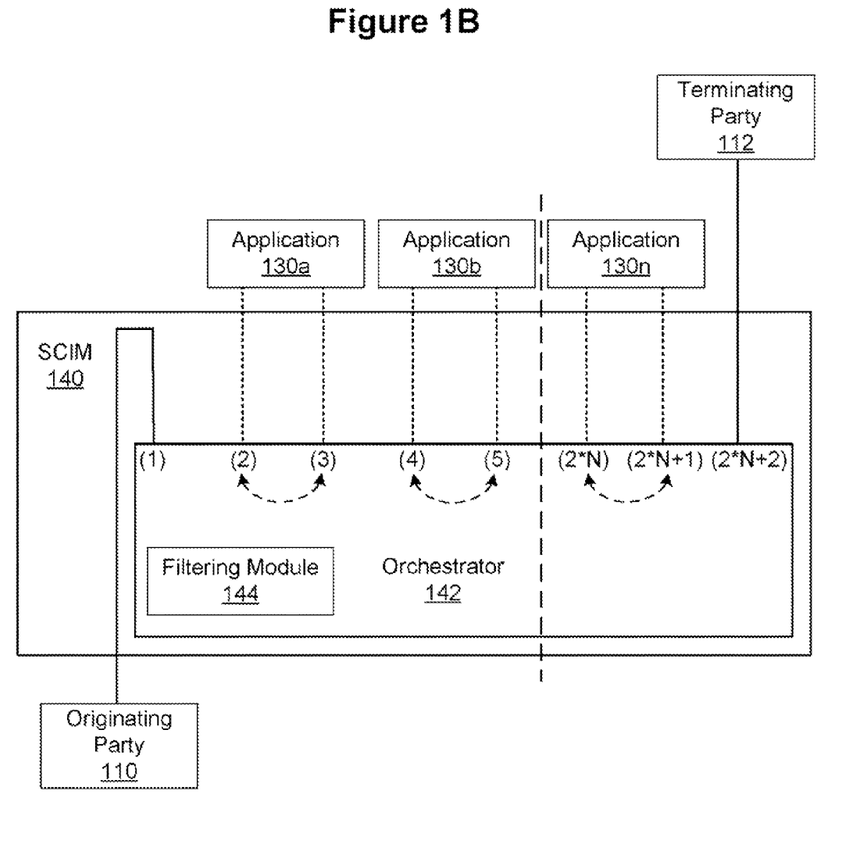
FIG. 1B shows an enhanced Service Capability Interaction Manager incorporating IFC filtering according to an embodiment of the invention.

FIG. 1B shows enhanced Service Capability Interaction Manager SCIM 140 incorporating IFC filtering according to an embodiment of the invention. As shown in FIG. 1B, SCIM 140 includes an orchestrator 142. Orchestrator 142 includes a filtering module 144 which provides for IFC filtering. SCIM 140 provides for orchestrating multiple applications 130*a*, 130*b*, and 130*n* in an application server. As before, a primary function of SCIM 140 is to allow chaining of applications 130*a*, 130*b*, 130*n* thereby allowing operators to use multiple applications from different vendors while simplifying applications and maintenance costs. SCIM orchestration is done according to the signaling from the network. Orchestrator 142 of SCIM 140 orchestrates the applications 130*a*, 130*b*, and 130*n* by creating a chain of applications.

As before, SCIM 140 and orchestrator 142 generate pairs of back to back (B2B) legs. For each initial incoming event it creates a leg that handles messages that belongs to that dialog, it then finds the next application it should route the message to and creates a peer B2B leg that should handle events coming and going from the targeted application for that specific dialog. As shown in FIG. 1B, leg mapping for forward messages is: 1→2; 3→4; 5→6; 7→8. The leg mapping for backward messages is: 8→7; 6→5; 4→3; 2→1. The mapping does not vary, however, filtering module 144 allows for skipping between legs as described below.

An extension is provided in the IFC in which criteria are inserted for every application designating the information that the application is interested in. The IFC Extension section includes an additional section ApplicationCriteria which allows for specifying a regular expression that can be used to evaluate each passed non-initial request after the chain has been created. The filtering module 144 implements a filtering method to check the IFC ApplicationCriteria with respect to each non-initial request passed through the chain. The filtering module 144 filters out non-initial requests from applications for which the request does not meet the ApplicationCriteria thereby causing orchestrator 142 to bypass the application.

FIG. 1B shows a chain of N applications 130*a*, 130*b*, and 130*n*. The chain includes every application 130*a*, 130*b*, 130*n* indicated by signaling from the network. However information passing between the originating party 110 and the terminating party 112 need not pass through all applications in the chain. Filtering module 144 utilizes Initial Filtering Criteria (IFC) such that information passing between the originating party 110 and the terminating party 112 passes only through those applications "interested" in the information. Applications which are not "interested" in a message are bypassed as shown by the curved dashed lines in FIG. 1B. Thus, the passing of a request over the application chain is effectively shortened by omitting unnecessary links. Consequently, the function of SCIM 140 is enhanced by avoiding the cost of passing all information to each application and the resulting overhead in resources and latency. Functionality is not sacrificed because those applications interested in the information are still provided with the information.

The filtering module 144 of SCIM 140 implements the following methods to filter requests and responses. For each non-initial request, before passing the request on the chain to the next application (leg), the filtering module will check to determine if the request matches the ApplicationCriteria, or if the request is a session terminating request. If the request matches the ApplicationCriteria, or if the request is a session terminating request, the-request is passed to the next application in the chain. If the request does not match the ApplicationCriteria, and the request is not a session terminating request, the request is added to the applications-by-passed-requests (to allow passing of associated responses). The filtering module 144 then finds the application's other leg (the return leg from the application) (2*N/ 2*N+1) and passes the request to the other leg's connection. This next leg is then evaluated by the filtering module to determine whether the application should receive the request or be bypassed.

For each provisional response message, before passing the message on the chain to the next application (leg), the filtering module determines if the provisional response is for a request in the applications-by-passed-requests. If the provisional response is not for a request in the applications-by-passed-requests, the response message is passed to the application. If the provisional response message is for a request in the applications-by-passed-requests, the filtering module 144 finds the following applications other leg (the return leg from the application) (2*N+½*N) and passes the request to the other legs connection. If this is a final response the associated by passed request is also removed from the applications-by-passed-requests. In this way responses are routed in the same manner (but reverse direction) as the associated requests.

As an example of the functionality of SCIM 140 including filtering module 144 we can consider a scenario involving a Location Normalization Application, a Charging Application, and an Advice of Charge (AOC) Application. In practice a chain may include additional or alternative applications than these examples). The Location Normalization application (location@apps) criteria is <ApplicationCriteria>*\r\nP-Access-Network-Info: *</ApplicationCriteria>: P-Access-Network-Info is defined by 3GPP (in RFC3455) and if included marks the access network location information (that needs to be normalized). Thus, a request that includes this header carries location information and thus the location normalization application must be invoked. A request that does not include this header does not carry location information and thus the location normalization application is not interested in the request and need not be invoked. The Charging application (charging@apps) has no ApplicationCriteria and will have all traffic passed through it. The Advice of Charge application (aoc@apps) criteria is <ApplicationCriteria>BYE*</ApplicationCriteria>: a BYE request marks the end of a session. If a request is not a BYE request then the Advice of Charge is not interested in this request and need not be invoked. Conversely, if a request is a BYE request then the Advice of Charge application is interested in this request and should be invoked.

The following illustrates establishment of filtering criteria for the applications in order to allow for filtering to achieve the desired routing of messages in accordance with the requirements of the applications. Note that this is an example only. One advantage of the present system and method is that ApplicationCriteria can be easily defined and configured for each application depending upon the type of information that the application is required to process. All that is required is configuration of the related ApplicationCriteria. The filtering logic of the SCIM does not need to be altered when new applications are added to the system.

```
<InitialFilterCriteria>
    <Priority>2</Priority>
    <TriggerPoint>
        <ConditionTypeCNF>0</ConditionTypeCNF>
        <SPT>
            <ConditionNegated>0</ConditionNegated>
            <Group>0</Group>
            <Method>INVITE</Method>
        </SPT>
    </TriggerPoint>
    <ApplicationServer>
        <ServerName>sip:location@apps</ServerName>
        <DefaultHandling>0</DefaultHandling>
        <ServiceInfo></ServiceInfo>
        <Extension>
            <ApplicationCriteria>*\r\n P-Access-
            Network-Info:
            *</ApplicationCriteria>
        </Extension>
    </ApplicationServer>
</InitialFilterCriteria>
<InitialFilterCriteria>
    <Priority>3</Priority>
    <TriggerPoint>
        <ConditionTypeCNF>0</ConditionTypeCNF>
        <SPT>
            <ConditionNegated>0</ConditionNegated>
            <Group>0</Group>
            <Method>INVITE</Method>
        </SPT>
    </TriggerPoint>
    <ApplicationServer>
        <ServerName>sip:charging@apps</ServerName>
        <DefaultHandling>0</DefaultHandling>
        <ServiceInfo></ServiceInfo>
    </ApplicationServer>
</InitialFilterCriteria>
<InitialFilterCriteria>
    <Priority>4</Priority>
    <TriggerPoint>
        <ConditionTypeCNF>0</ConditionTypeCNF>
        <SPT>
            <ConditionNegated>0</ConditionNegated>
            <Group>0</Group>
            <Method>INVITE</Method>
        </SPT>
    </TriggerPoint>
    <ApplicationServer>
        <ServerName>sip:aoc@apps</ServerName>
        <DefaultHandling>0</DefaultHandling>
        <ServiceInfo></ServiceInfo>
        <Extension>
            <ApplicationCriteria> BYE *</
            ApplicationCriteria>
        </Extension>
    </ApplicationServer>
</InitialFilterCriteria>
</IFCs>
```

FIGS. 2A-2D show sequence diagrams illustrating the filtering functionality provided by embodiments of the present invention. FIGS. 2A-2D illustrate message routing between originating party (A) 291 and terminating party (B) 292. Three applications are utilized to process messages in this example, Location Application 294, Charging Application 296, and Advice of Charge (AOC) Application 298. Location Application 294 need only be activated if location information is provided in a message. Charging Application 296 needs to be activated for all messages. AOC Application needs only to be activated on completion of a call to provide an SMS on charge of a completed call.

Figure 2A:
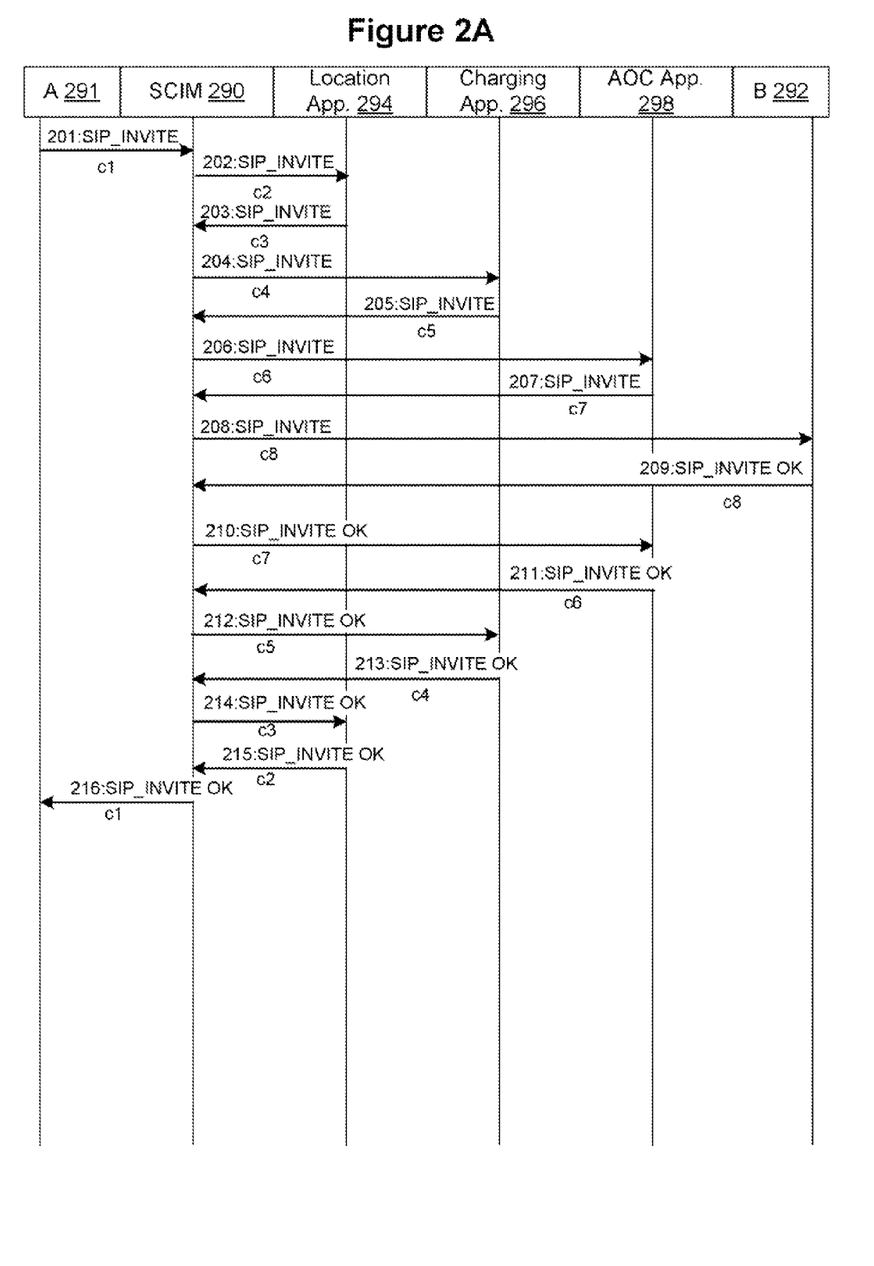
FIGS. 2A-2D show sequence diagrams illustrating message routing using IFC filtering according to an embodiment of the invention.

FIG. 2A shows message routing for the initial SIP Invite and Response (OK). As shown in FIG. 2A, at step 201, originating party 291 sends a SIP Invite to SCIM 290. This being an initial message, SCIM 290 passes the message through each application. At step 202, SCIM 290 transmits the SIP Invite to Location Application 294. At step 203, the Location Application 294 transmits the SIP Invite to SCIM 290. At step 204, SCIM 290 transmits the SIP Invite to Charging Application 296. At step 205, the Charging Application 296 transmits the SIP Invite to SCIM 290. At step 206, SCIM 290 transmits the SIP Invite to AOC Application 298. At step 207, the AOC Application 294 transmits the SIP Invite to SCIM 290. At step 208, SCIM 290 transmits the SIP Invite to terminating party 292.

As also shown in FIG. 2A, terminating party 292 sends a response message (SIP_Invite OK) to SCIM 290. No applications were bypassed for the SIP Response message. Accordingly, SCIM 290 passes the response message through each application. At step 210, SCIM 290 transmits the SIP Response to AOC Application 298. At step 211, the AOC Application 294 transmits the SIP Response to SCIM 290. At step 212, SCIM 290 transmits the SIP Response to Charging Application 296. At step 213, the Charging Application 296 transmits the SIP Response to SCIM 290. At step 214, SCIM 290 transmits the SIP Response to Location Application 294. At step 215, the Location Application 294 transmits the SIP Response to SCIM 290. At step 216, SCIM 290 transmits the SIP Response to originating party 291.

Figure 2B:
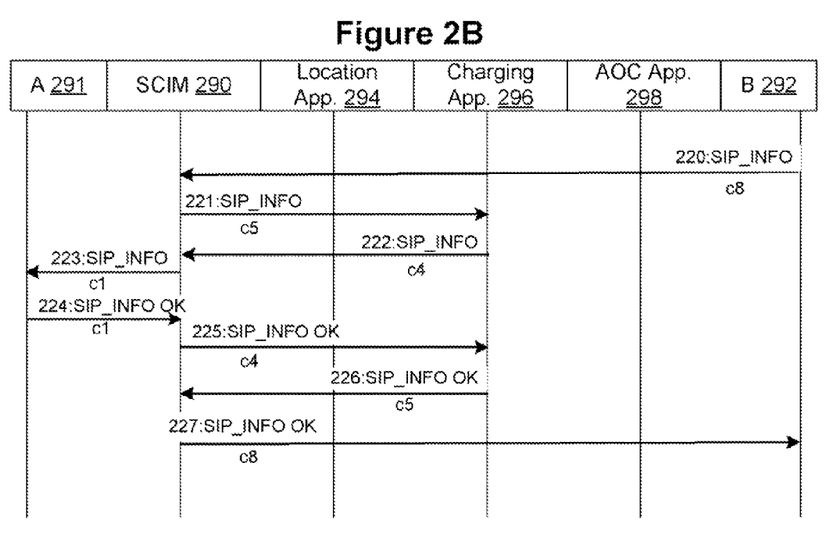

FIG. 2B shows message routing for a SIP_Info request from B 292 As shown in FIG. 2B, at step 220 B 292 sends a SIP Info request to SCIM 290. The message does not satisfy the ApplicationCriteria of AOC Application 298 and the SCIM adds the request to the AOC applications-bypassed-requests. The AOC Application is bypassed and SCIM checks for the next application. The message satisfies the ApplicationCriteria of Charging Application 296. Accordingly, at step 221, SCIM 290 transmits the SIP Info request to Charging Application 296. At step 222, Charging Application 296 transmits the SIP Info request to SCIM 290. The message does not satisfy the ApplicationCriteria of Location Application 294. Thus, the request is added to the Location Application applications-by-passed-requests. The Location Application is bypassed and SCIM 290 transmits the SIP Info request to originating part 291 at step 223.

At step 224, originating party 291 transmits a SIP Info response to SCIM 290. The SIP Info request is in the Location Application applications-by-passed-requests. The Location Application is thus bypassed and SCIM 290 transmits the SIP Info response to Charging Application 296 at step 225. At step 226, Charging Application 296 transmits the SIP Info response to SCIM 290. The SIP Info request is in the AOC Application applications-by-passed-requests. The AOC Application is thus bypassed, and at step 227, SCIM 290 transmits the SIP Info response to B 292.

Figure 2C:
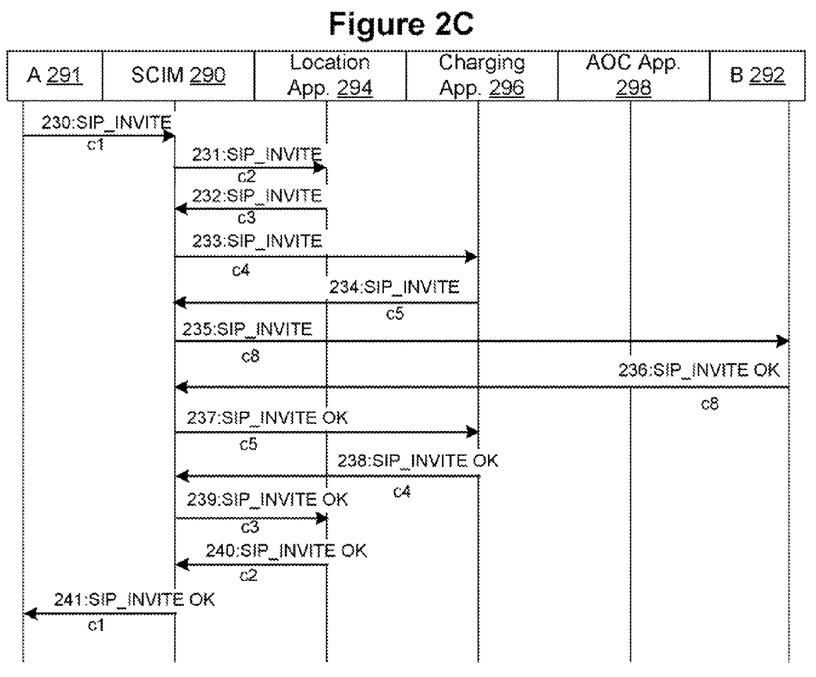

FIG. 2C shows message routing for a subsequent (non-initial) SIP Invite and Response (OK). As shown in FIG. 2A, at step 230, originating party 291 sends a SIP Invite to SCIM 290. The SIP Invite contains P-Access-Network-Info and matches the Location Application ApplicationCriteria. At step 231, SCIM 290 transmits the SIP Invite to Location Application 294. At step 232, the Location Application 294 transmits the SIP Invite to SCIM 290. At step 233, SCIM 290 transmits the SIP Invite to Charging Application 296. At step 234, the Charging Application 296 transmits the SIP Invite to SCIM 290. The message does not satisfy the ApplicationCriteria of AOC Application 298. Thus the request is added to the AOC Application 298 applications-by-passed-requests. The AOC Application 298 is bypassed and SCIM 290 transmits the SIP Invite to B 292.

As also shown in FIG. 2C, at step 236, terminating party 292 sends a response message (SIP_Invite OK) to SCIM 290. The SIP_Invite request is in the AOC Application 298 applications-by-passed-requests. The AOC Application 298 is thus bypassed and SCIM 290 transmits the SIP Invite response to Charging Application 296 at step 237. At step 238, Charging Application 296 transmits the SIP Invite response to SCIM 290. At step 239, SCIM 290 transmits SIP Invite response to Location Application 294. At step 240, Location Application 294 transmits SIP Invite response to SCIM 290. At step 241, SCIM 290 transmits SIP Invite response to Originating Party 291.

Figure 2D:
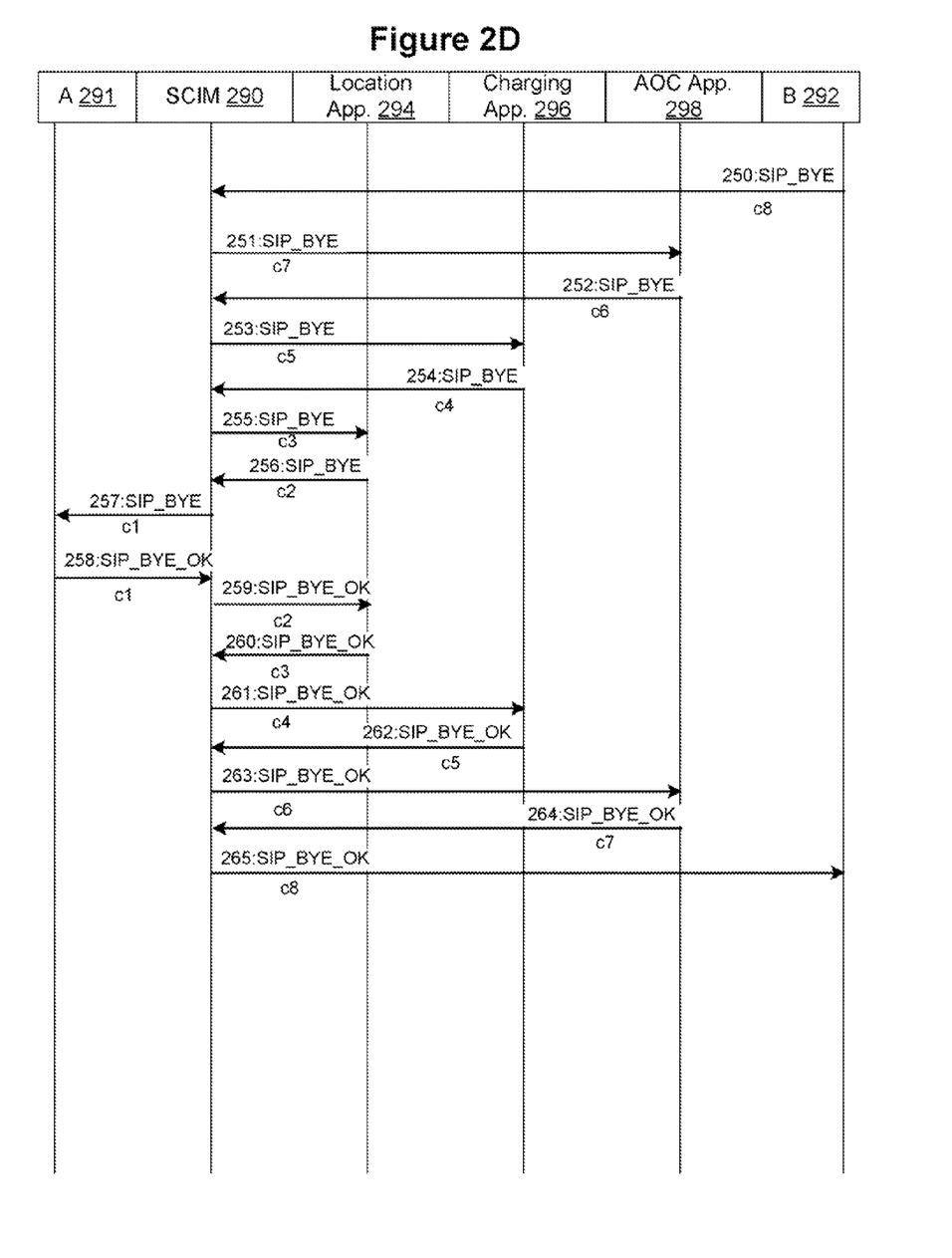

FIG. 2D shows message routing for the SIP Terminating message (SIP_BYE) and Response (SIP_BYE_OK). As shown in FIG. 2D, at step 250, terminating party 292 sends a SIP_BYE message to SCIM 290. At step 251, SCIM 290 transmits the SIP_BYE message to AOC Application 298. At step 252, the AOC Application 294 transmits the SIP_BYE message to SCIM 290. At step 253, SCIM 290 transmits the SIP_BYE message to Charging Application 296. At step 254, the Charging Application 296 transmits the SIP_BYE message to SCIM 290. At step 255, SCIM 290 transmits the SIP_BYE message to Location Application 294. At step 256, the Location Application 294 transmits the SIP_BYE message to SCIM 290. At step 257, SCIM 290 transmits the SIP_BYE message to originating party 291.

Also as shown in FIG. 2D, at step 258, originating party 291 sends a SIP_BYE_OK response to SCIM 290. SCIM 290 passes the message through each application. At step 259, SCIM 290 transmits the SIP_BYE_OK response to Location Application 294. At step 260, the Location Application 294 transmits the SIP_BYE_OK response to SCIM 290. At step 261, SCIM 290 transmits the SIP_BYE_OK response to Charging Application 296. At step 262, the Charging Application 296 transmits the SIP_BYE_OK response to SCIM 290. At step 263, SCIM 290 transmits the SIP_BYE_OK response to AOC Application 298. At step 264, the AOC Application 294 transmits the SIP_BYE_OK response to SCIM 290. At step 265, SCIM 290 transmits the SIP_BYE_OK response to terminating party 292.

FIGS. 2A through 2D show examples of message flow incorporating the IFC filtering mode which allows for bypassing of applications. In comparison, a conventional SCIM (FIG. 1A) is required to pass each message in the same manner as the initial request (FIG. 2A), i.e. each request and response is passed through every application in the chain. The IFC filtering mode thereby reduces communications overhead and latency. TABLE I shows a comparison between the two methods in this specific flow. The X marks indicate which requests and responses are passed through the identified application.

TABLE I

| | Conventional SCIM | | | Filtering SCIM | | |
|---|---|---|---|---|---|---|
| | Location | Charging | AOC | Location | Charging | AOC |
| Invite | X | X | X | X | X | X |
| Invite_ok | X | X | X | X | X | X |
| Info | X | X | X | | X | |
| Info_ok | X | X | X | | X | |
| ReInvite (with location) | X | X | X | X | X | |
| Reinvite_ok | X | X | X | X | X | |
| Bye | X | X | X | X | X | X |
| Bye_ok | X | X | X | X | X | X |
| Messages | 8 | 8 | 8 | 6 | 8 | 4 |

TABLE II summarizes the information from TABLE I and computes the percentage of relevant messages for each application. As can be seen from TABLE II, for the conventional SCIM only 75% of the messages reaching the Location Application would be relevant to the Location Application, and only 50% of the messages reaching the AOC Application would be relevant to the AOC Application. Conversely, for the conventional SCIM only 25% of the messages reaching the Location Application would be irrelevant to the Location Application, and 50% of the messages reaching the AOC Application would be irrelevant to the AOC Application. Transmission and processing of these irrelevant messages results in unnecessary communication and processing overhead and increased latency. In comparison, by applying the SCIM filtering functionality for these three sample applications using this specific sample flow all applications reach 100% of processing of relevant messages. Thus, the SCIM filtering functionality, by avoiding the transmission and processing of irrelevant messages, results in reduced communication and processing overhead and reduced latency.

TABLE II

|  | Conventional SCIM | | | Filtering SCIM | | |
| --- | --- | --- | --- | --- | --- | --- |
|  | Location | Charging | AOC | Location | Charging | AOC |
| Total number of messages | 8 | 8 | 8 | 6 | 8 | 4 |
| Percent of relevant messages | 75% | 100% | 50% | 100% | 100% | 100% |
| Percent of irrelevant messages | 25% | 0% | 50% | 0% | 0% | 0% |

Figure 3A:
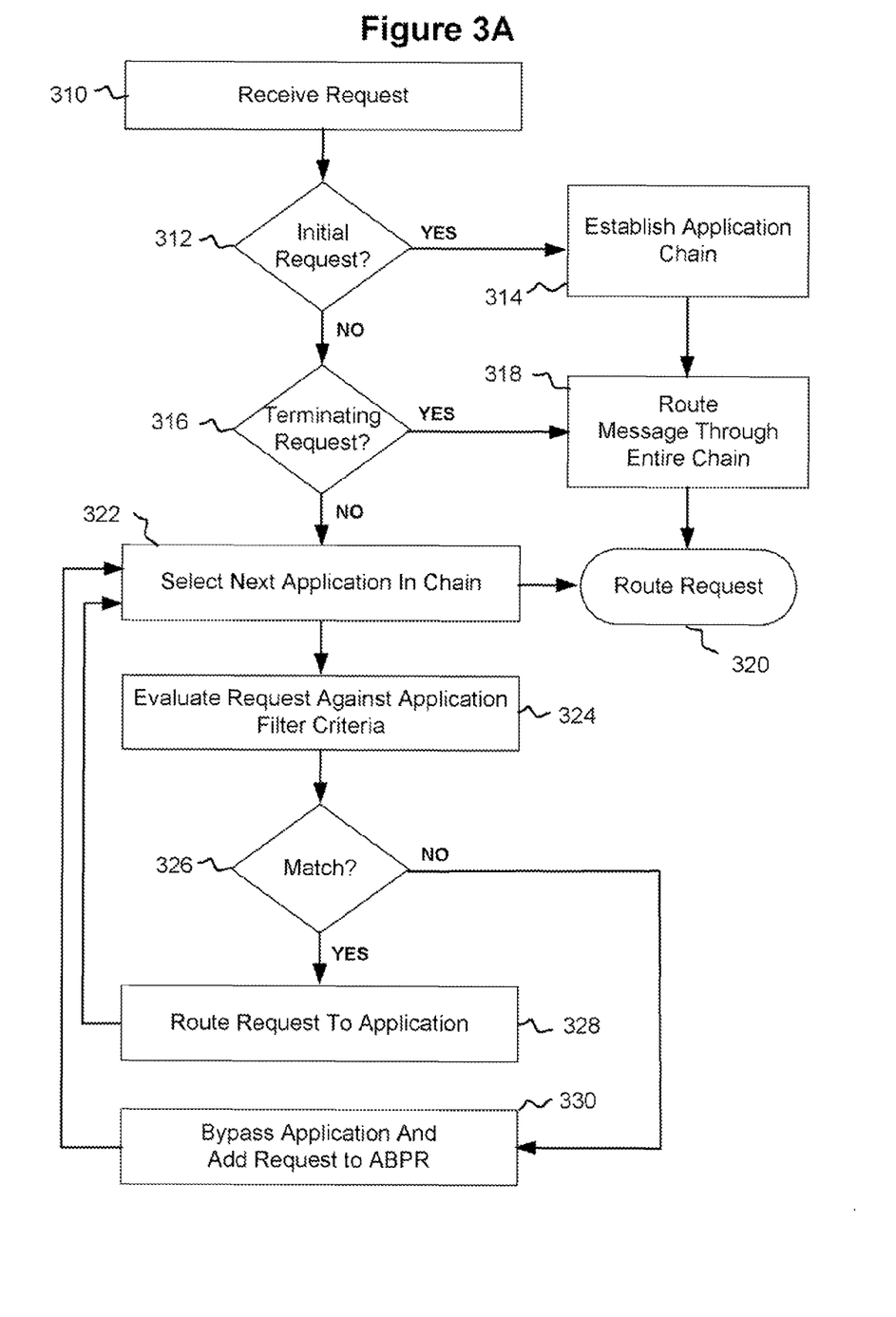
FIG. 3A shows a method for routing requests according to an embodiment of the invention.
Figure 3B:
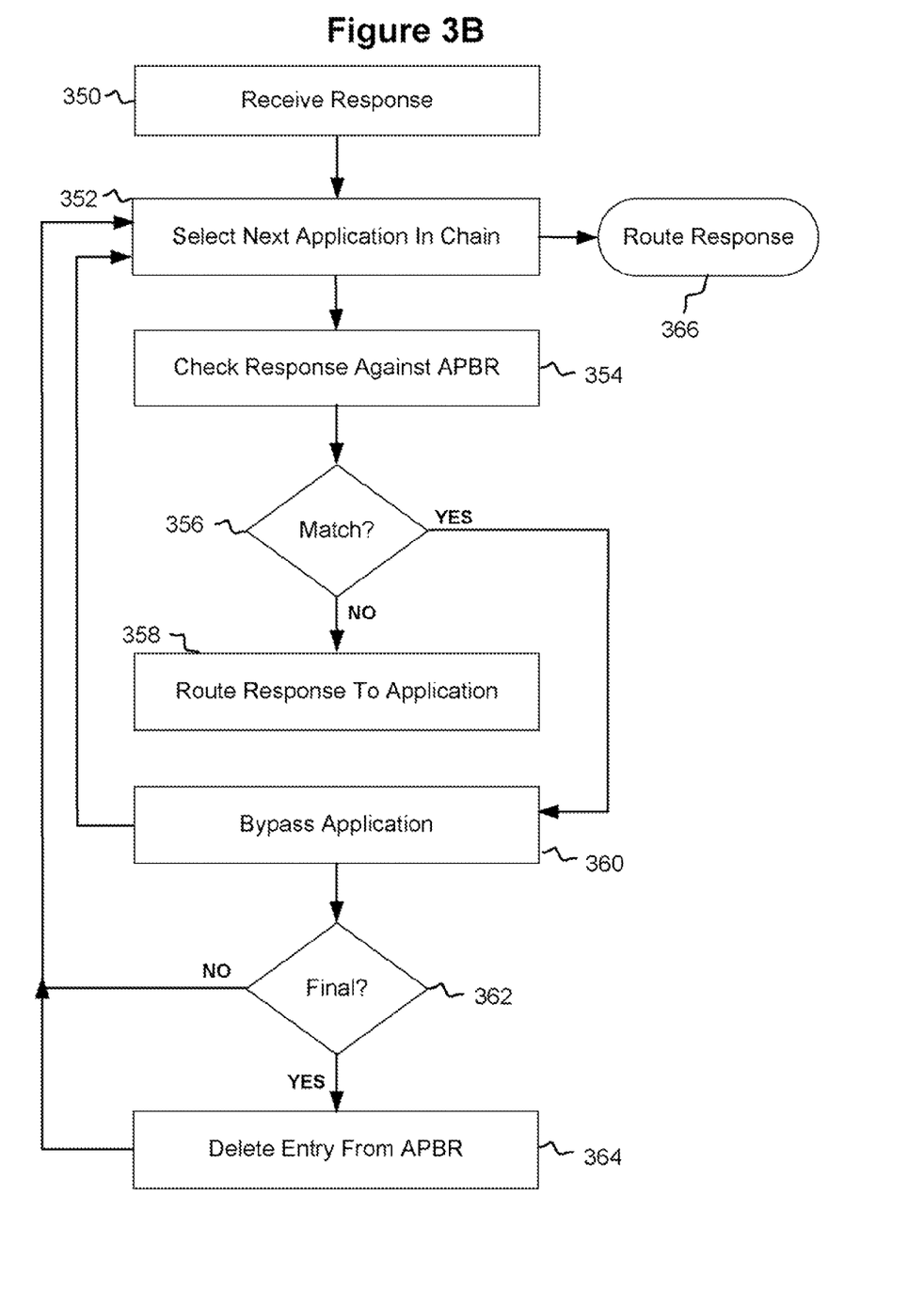
FIG. 3B shows a method for routing responses according to an embodiment of the invention.

FIGS. 3A and 3B show methods performed by a SCIM incorporating filtering of application criteria to allow bypassing of applications in a chain. FIG. 3A shows a method for routing requests, and FIG. 3B shows a method for routing responses.

As shown in FIG. 3A, the SCIM receives a request-at step 310. At step 312, the SCIM determines if the request is an initial request. If the request is an initial request, the SCIM determines the appropriate next application in the chain based upon the network signaling. Then, at step 318, the SCIM routes the request to the next application in the application chain. At step 320, after routing the request through the last application in the chain, the SCIM routes the request to the recipient.

If, at step 312, the SCIM determines that the request is not an initial request, the SCIM determines if the request is a terminating request at step 316. If the request is a terminating request, the SCIM routes the terminating request through each of the applications in the application chain at step 318. At step 320, after routing the terminating request through the last application in the chain, the SCIM routes the request to the recipient.

If, at step 316, the SCIM determines that the request is not a terminating request, the SCIM selects, at step 322, the next application in the chain previously established. At step 324, the SCIM evaluates the request against the application filter criteria. If the request matches the ApplicationCriteria for the current selected application, at step 326, the SCIM routes the request to the application at step 328. The SCIM selects the next application at step 322 when the request returns. At step 320, after routing the request through the last application in the chain, the SCIM routes the request to the recipient.

If, at step 326, the request does not match the Application-Criteria, the SCIM bypasses the application and adds the request to the applications-by-passed-requests (for routing of responses). Bypass is achieved by the SCIM/filtering module finding the application's other leg (2*N/2*N+1) and passing the request to the other leg's connection (see FIG. 1B). Thus, without routing the message through the current application, the SCIM selects the next application at step 322.

FIG. 3B shows a method for routing responses. The response should be sent to an application only if the associated request has been passed through the application. The response method ensures that responses are returned through the same applications as the related request (in the reverse order). However it is not necessary to compare the response messages against the filter criteria because the applications bypassed by the associated request are identified in the applications-by-passed-requests.

As shown in FIG. 3B, the SCIM receives a response from a party at step 350. At step 352, the SCIM selects the first/next application in the application chain. At step 354, the SCIM checks to see if the response's associated request is in the applications-by-passed-requests. If, at step 356, the SCIM determines that the response's associated request is not in the applications-by-passed-requests, the response is routed to the application for processing. When the response returns from the application, the SCIM selects the next application in the application chain, step 352. If no applications remain to be processed, the response is routed to the recipient at step 366.

If, at step 356, the SCIM determines that the response's associated request is in the applications-by-passed-requests, the application is bypassed at step 360. Bypass is achieved by the SCIM/filtering module finding the following application's other leg (2*N/2*N+1) and passing the request to the other leg's connection (see FIG. 1B). At step 362, the SCIM determines whether the response is a final response. If the response is a final response, the entry for the response associated request is deleted from the applications-by-passed-requests at step 364 and then the SCIM selects the next application in the application chain, step 352. If the response is not a final response, the entry for the response associated request is maintained in the applications-by-passed-requests and the SCIM selects the next application in the application chain, step 352. If no applications remain to be processed, the response is routed to a recipient at step 366.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for operating a service capability interaction manager which provides for orchestrating a plurality of applications, arranged as an application chain based on an initial message, for processing messages of a session, the method comprising: configuring respective application criteria for each application of said plurality of applications, wherein each application criteria indicate whether a message of the session is to be processed by a corresponding application of said application chain when the application chain processes the message of the session; receiving a non-initial request associated with the session from an originating party at the service capability interaction manager; comparing said non-initial request to the respective application criteria of each of application in said application chain; routing said non-initial request to each application in said application chain, for processing, when said non-initial request satisfies corresponding application criteria; bypassing processing of the non-initial request by each application in said application chain for which said non-initial request does not satisfy corresponding application criteria; recording said non-initial request for each application bypassed in a respective applications-by-passed requests lists; forwarding the non-initial request, after processing by the application chain, from the service capability interaction manager to a terminating party; receiving a non-final response from the terminating party at the service capability interaction manager; routing said non-final response to each application in said application chain when the non-initial request does not appear in the corresponding applications-by-passed-requests list respectively associated with each application in the application chain; bypassing processing of the non-final response by each application in said application chain for which the non-initial request appears in the corresponding applications-by-passed-requests list respectively associated with each application in the application chain; and forwarding the non-final response from the service capability interaction manager to the originating party.

2. The method of claim 1, further comprising subsequent to the steps of claim 1: receiving a final response from the terminating party at the service capability interaction manager; routing said final response to each application in said application chain, for processing, when said non-initial request does not appear in the corresponding applications-by-passed-requests list respectively associated with each application in the application chain; deleting the non-initial request from the corresponding applications-by-passed-requests list for each application in the application chain in which the non-initial request appears; and forwarding said final response, after processing by the application chain, from the service capability interaction manager to the originating party.

3. The method of claim 1, further comprising, prior to the step of claim 1: receiving an initial request, for the session, from the originating party at the service capability interaction manager; creating said application chain for processing the messages of the session, said application chain comprising applications of said plurality of applications; and routing said initial request to each application in said application chain.

4. The method of claim 1, further comprising, subsequent to the steps of claim 1: receiving a terminating request for the session at the service capability interaction manager; and routing said terminating request to each application in said application chain.

5. The method of claim 1, wherein bypassing an application comprises, routing the non-initial message to an application in the application chain which is subsequent to the application to be bypassed.

6. A method for operating a service capability interaction manager which provides for orchestrating at least a first applications having a first criteria, a second application having a second criteria, and a third application having a third criteria, wherein the first, second and third criteria respectively indicate whether a message is to be processed by said first, second and third applications, the method comprising: receiving an initial request, for a session, from an originating party at the service capability interaction manager; creating an application chain for processing messages of the session associated with said initial request, said application chain comprising at least the first application, the second application and the third application in sequence; routing said initial request through each application of the application chain; receiving a non-initial request associated with the session at the service capability interaction manager; routing said non-initial request to the first application in the application chain, for processing, when said non-initial request matches the first criteria and bypassing the first application in the application chain when said non-initial request does not match the first criteria; recording the non-initial request in a first applications-by-passed-requests list associated with the first application when said non-initial request does not match the first criteria; routing said non-initial request to the second application in the application chain, for processing, when said non-initial request matches the second criteria and bypassing the second application in the application chain when said non-initial request does not match the second criteria; recording the non-initial request in a second applications-by-passed-requests associated with the second application list when said non-initial request does not match the second criteria; routing said non-initial request to the third application in the application chain, for processing, when said non-initial request matches the third criteria and bypassing the third application in the application chain when said non-initial request does not match the third criteria; and recording the non-initial request in a third applications-by-passed-requests list associated with the third application when said non-initial request does not match the third criteria; receiving a non-final response with the service capability interaction manager; routing said non-final response to the third application when the non-initial request is not present on the third applications-by-passed-requests list associated with the third application and bypassing the third application when said non-initial request is present on the third applications-by-passed-requests list associated with the third application; routing said non-final response to the second application when said non-initial request is not present on the second applications-by-passed-requests list associated with the second application and bypassing the second application when said non-initial request is present on the second applications-by-passed-requests list associated with the second application; and routing said non-final response to the first application when said non-initial request is not present on the first applications-by-passed-requests list associated with the first application and bypassing the first application if said non-initial request is present on the first applications-by-passed-requests list for the first application.

7. The method of claim 6, further comprising subsequent to the steps of claim 6: receiving a final response from the terminating party at the service capability interaction manager, wherein the final response is associated with the non-initial request; routing said final response to the third application, for processing, when said non-initial request is not present on the third applications-by-passed-requests list associated with the third application, bypassing processing of the final response by the third application when the non-initial request is present on the third applications-by-passed-requests list, and deleting said non-initial request from the third applications-by-passed-requests list associated with the third application when said non-initial request is present on the third applications-by-passed-requests list; routing said final response to the second application, for processing, when said non-initial request is not present on the second applications-by-passed-requests list associated with the second application, bypassing processing of the final response by the second application when the non-initial request is present on the second applications-by-passed-requests list, and deleting said non-initial request from the second applications-by-passed-requests list for the second application when said non-initial request is present on the second applications-by-passed-requests list; and routing said final response to the first application, for processing, when said non-initial request is not present on the first applications-by-passed-requests list associated with the first application, bypassing processing of the final response by the first application when the non-initial request is present on the first applications-by-passed-requests list, and deleting said non-initial request from the first applications-by-passed-requests list associated with the first application if said non-initial request is present on the first applications-by-passed-requests list.

8. The method of claim 6, further comprising, subsequent to the steps of claim 6: receiving a final request for the session at the service capability interaction manager; and routing said final request through the first application, the second application and the third application, in sequence.

9. A non-transitory computer readable storage medium including instructions stored thereon which, when executed by a computer, cause the computer to perform a method comprising the steps of: configuring respective application criteria for each application of a plurality of applications, arranged as an application chain based on an initial message, for processing messages of a session, wherein each application criteria indicate whether a message of the session is to be processed by a corresponding application of said application chain when the application chain processes the message of the session; receiving a non-initial request associated with the session from an originating party at the service capability interaction manager; comparing said non-initial request to the respective application criteria of each of application in said application chain; routing said non-initial request to each application in said application chain, for processing, when said non-initial request satisfies corresponding application criteria; bypassing each application in said application chain for which said non-initial request does not satisfy corresponding application criteria; recording said non-initial request for an application bypassed during processing of the non-initial request by said application chain in an applications-by-passed-requests list associated with the application bypassed; forwarding the non-initial request, after processing by the application chain, from the service capability interaction manager to a terminating party; and receiving a non-final response from the terminating party at the service capability interaction manager; routing said non-final response to each application in said application chain when said non-initial request does not appear in the corresponding applications-by-passed-requests list respectively associated with each application in the application chain; bypassing each application in said application chain for which said non-initial request does appear in the corresponding applications-by-passed-requests list respectively associated with each application in the application chain; and forwarding the non-final response from the service capability interaction manager to the originating party.

10. The non-transitory computer readable storage medium of claim 9, including further instructions stored thereon which, when executed by a computer, cause the computer to perform a method comprising the further steps of: receiving a final response, associated with said non-initial request, from the terminating party at the service capability interaction manager; routing said final response to each application in said application chain, for processing, when said non-initial request does not appear in the corresponding applications-by-passed-requests list respectively associated with each application in the application chain; deleting said non-initial request from the corresponding applications-by-passed-requests list for each application in said application chain for which said non-initial request appears; and forwarding said final response, after processing by the application chain, from the service capability interaction manager to the originating party.

11. The non-transitory computer readable storage medium of claim 9, including further instructions stored thereon which, when executed by a computer, cause the computer to perform a method comprising the further steps of: receiving an initial request, for the session, from the originating party at the service capability interaction manager; creating said application chain for processing the messages of the session, said application chain comprising applications of said plurality of applications; and routing said initial request to each application in said application chain.

12. The non-transitory computer readable storage medium of claim 9, including further instructions stored thereon which, when executed by a computer, cause the computer to receiving a terminating request for the session at the service capability interaction manager; and routing said terminating request to each application in said application chain.

13. The non-transitory computer readable storage medium of claim 9, wherein bypassing an application comprises routing the non-initial message to an application in the application chain which is subsequent to the application to be bypassed.

14. A system for orchestrating at least a first application having a first criteria, a second application having a second criteria and a third application having a third criteria, wherein the first, second and third criteria are indicative of messages to be processed by said first, second and third applications, the system comprising: one or more microprocessors executing computer-executable instructions implementing a service capability interaction manager thereby configuring the one or more microprocessors to: receive an initial request of a session with the service capability interaction manager; create an application chain for processing messages of the session, the application chain comprising at least the first application, the second application and the third application; route the initial request through the first application, the second application and the third application, in sequence; receive a non-initial request with the service capability interaction manager; route the non-initial request to the first application if said non-initial request matches the first criteria and bypass the first application if the non-initial request does not match the first criteria; record the non-initial request in a first applications-by-passed-requests list for the first application if the non-initial request does not match the first criteria; route the non-initial request to the second application if said non-initial request matches the second criteria and bypass the second application if the non-initial request does not match the second criteria; record the non-initial request in a second applications-by-passed-requests list for the second application if the non-initial request does not match the second criteria; route the non-initial request to the third application if said non-initial request matches the third criteria and bypass the third application if the non-initial request does not match the third criteria; and record the non-initial request in a third applications-by-passed-requests list for the third application if the non-initial request does not match the third criteria.

* * * * *

UNITED STATES PATENT AND TRADEMARK OFFICE
CERTIFICATE OF CORRECTION

| | |
|---|---|
| PATENT NO. | : 9,736,189 B2 |
| APPLICATION NO. | : 13/974998 |
| DATED | : August 15, 2017 |
| INVENTOR(S) | : Livne et al. |

It is certified that error appears in the above-identified patent and that said Letters Patent is hereby corrected as shown below:

On the Title Page

In Column 1, under Title, Line 4, delete "INITIALFILTERCRITIERIA" and insert -- INITIALFILTERCRITERIA --, therefor.

In the Specification

In Column 1, Line 4, delete "INITIALFILTERCRITIERIA" and insert -- INITIALFILTERCRITERIA --, therefor.

In Column 3, Line 12, delete "1f" and insert -- if --, therefor.

Signed and Sealed this
Twenty-sixth Day of June, 2018

Andrei Iancu
*Director of the United States Patent and Trademark Office*